US012455573B2

(12) United States Patent
Lee et al.

(10) Patent No.: US 12,455,573 B2
(45) Date of Patent: Oct. 28, 2025

(54) MOBILE ROBOT PLATOON DRIVING SYSTEM AND CONTROL METHOD THEREOF

(71) Applicants: HYUNDAI MOTOR COMPANY, Seoul (KR); KIA CORPORATION, Seoul (KR)

(72) Inventors: Yoon Soo Lee, Incheon (KR); Youngjin Jung, Cheonan-si (KR); Kyung Dong Park, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 152 days.

(21) Appl. No.: 18/504,776

(22) Filed: Nov. 8, 2023

(65) Prior Publication Data
US 2024/0069569 A1    Feb. 29, 2024

Related U.S. Application Data

(62) Division of application No. 17/323,774, filed on May 18, 2021, now Pat. No. 11,846,952.

(30) Foreign Application Priority Data

Jul. 20, 2020    (KR) ........................ 10-2020-0089569

(51) Int. Cl.
*G05D 1/69*    (2024.01)
*G05D 1/00*    (2006.01)
(Continued)

(52) U.S. Cl.
CPC ......... *G05D 1/0291* (2013.01); *G05D 1/0022* (2013.01); *G05D 1/0274* (2013.01); *G07C 5/008* (2013.01); *G07C 5/0816* (2013.01)

(58) Field of Classification Search
CPC .. G05D 1/0291; G05D 1/0022; G05D 1/0274; G05D 1/0297; G05D 1/0293;
(Continued)

(56) References Cited

U.S. PATENT DOCUMENTS 4,556,940 A    12/1985 Katoo et al.
10,579,071 B1    3/2020 Li et al.
(Continued)

FOREIGN PATENT DOCUMENTS

| CN | 110825076 A | 2/2020 |
| CN | 111052026 A | 4/2020 |

(Continued)

OTHER PUBLICATIONS

"Cooperative Control of Mobile Robot for Carrying Object"; The Journal of Korea Robotics Society; vol. 10 Issue 3 / pp. 139-145 / 2015 / 1975-6291(pISSN)/ 2287-3961(eISSN).

*Primary Examiner* — Bao Long T Nguyen
(74) *Attorney, Agent, or Firm* — MCDONNELL BOEHNEN HULBERT & BERGHOFF LLP

(57) ABSTRACT

A mobile robot platooning system includes a plurality of mobile robots operated for transfer of objects in a factory, and a central server connected to the plurality of mobile robots through wireless communication, and configured to set a path of the plurality of mobile robots to control autonomous driving of the mobile robots, wherein the central server is configured to group a platoon of the mobile robots required for processing a work, dispose the platoon of the mobile robots into a predetermined platoon form, collect state information of the platoon of the mobile robots, and control the platoon of the mobile robots to move in a synchronized form based on the state information.

4 Claims, 8 Drawing Sheets

(51) Int. Cl.
*G07C 5/00* (2006.01)
*G07C 5/08* (2006.01)

(58) Field of Classification Search
CPC .... G05D 1/0236; G05D 1/024; G05D 1/0246; G05D 1/0276; G05D 1/0278; G05D 1/0295; G05D 1/221; G05D 1/222; G05D 1/225; G05D 1/0212; G05D 1/0027; G05D 1/0044; G05D 1/0016; G05D 1/0011; G07C 5/008; G07C 5/0816; G05B 19/41895; G05B 2219/39146; G05B 2219/39147; G05B 2219/39163
See application file for complete search history.

(56) References Cited

U.S. PATENT DOCUMENTS

| | | | |
|---|---|---|---|
| 2017/0308084 A1 | 10/2017 | Spicer et al. | |
| 2019/0294181 A1* | 9/2019 | Ohno | G05D 1/0088 |
| 2020/0081455 A1* | 3/2020 | Li | G05D 1/0293 |
| 2020/0264615 A1* | 8/2020 | Bryner | G01N 29/223 |
| 2021/0011487 A1 | 1/2021 | Nawade et al. | |
| 2021/0094423 A1 | 4/2021 | Moon et al. | |
| 2021/0149416 A1* | 5/2021 | Srivastava | B66F 9/063 |

FOREIGN PATENT DOCUMENTS

| | | |
|---|---|---|
| KR | 1994-0006722 A | 4/1994 |
| KR | 2014-0003987 A | 1/2014 |
| KR | 2014-0086246 A | 7/2014 |
| KR | 10-1605994 B1 | 3/2016 |
| KR | 2019-0008709 A | 1/2019 |

\* cited by examiner

MOBILE ROBOT PLATOON DRIVING SYSTEM AND CONTROL METHOD THEREOF

CROSS REFERENCE TO RELATED APPLICATIONS

The present application is a Divisional of U.S. patent application Ser. No. 17/323,774, filed May 18, 2021, which claims priority to and the benefit of Korean Patent Application No. 10-2020-0089569 filed on Jul. 20, 2020, the entire contents of which are incorporated herein by reference.

TECHNICAL FIELD

The present disclosure relates to a mobile robot platooning system and a control method thereof.

BACKGROUND

In general, autonomous mobile robots (AMRs) may move to destinations by themselves while detecting their surroundings through sensors, avoid obstacles, and are optimized for picking, so they are equipped for unmanned logistics transfer in industry sites.

For example, in the production line of a vehicle factory where various objects (e.g., component parts) are assembled, an AMR is used for flexible and efficient transfer of parts. Particularly in the automated production process, the interruption of part supply during work greatly affects the line stoppage and yield, so it is important to transfer the parts to the right place at the right time.

Meanwhile, as for AMRs, an individual unit may pick up an item and transfer it to a target location, or multiple units cooperate to transfer a single large item, in which case, platooning of the AMRs is utilized.

Conventional platooning is controlled while slave units follow one master unit by utilizing a master-slave scheme for synchronized operation. At this time, for the follow-up, each AMR may be installed with an embedded system (e.g., a computer or a board) for complex operation processing and communication with the master unit or other slave units.

In this master-slave scheme, when a platooning instruction is given to the master unit from the central server, the master unit controls the slave units, and during this, synchronization errors such as communication delay and operation errors may occur.

That is, the conventional master-slave scheme deeply relies on the master unit, and the communication load and operation load are concentrated on the master unit during platooning. Due to this, there is a problem that platooning becomes impossible and line stoppage is caused when errors accumulate beyond a certain degree or a fail in the master unit occurs.

In addition, since the number of controllable slave units by the master unit during platooning is limited, the number of units grouped in a platoon is also limited.

The above information disclosed in this Background section is only for enhancement of understanding of the background of the disclosure, and therefore it may contain information that does not form the prior art that is already known in this country to a person of ordinary skill in the art.

SUMMARY

A mobile robot platooning system includes a plurality of mobile robots operated for transfer of objects in a factory, and a central server connected to the plurality of mobile robots through wireless communication, and configured to set a path of the plurality of mobile robots to control autonomous driving of the mobile robots. Here, the central server may be configured to group a platoon of the mobile robots required for processing a work, dispose the platoon of the mobile robots into a predetermined platoon form, collect state information of the platoon of the mobile robots, and control the platoon of the mobile robots to move in a synchronized manner based on the state information.

Each of the platoon of the mobile robots may be autonomous mobile robot (AMR) or automated guided vehicle (AGV), and moves for platooning along an instructed moving path to a destination according to a control instruction received at the central server.

The control instruction may include at least one of a moving direction, a moving speed, a destination coordinate, a moving path, and a synchronization signal with respect to a current position of the mobile robot.

The mobile robot may include a wireless communication module connected to the central server through a wireless communication network to communicate data, a driving sensor module configured to generate sensor data for detecting surrounding environment through at least one of a laser, a camera, a Lidar, and a high-precision DGPS, a driving module configured to operate a motor to generate a driving torque and to measure encoder data according to the operation of the motor, a memory configured to share and store a factory map and a coordinate system (x, y) generated by a simultaneous localization and mapping (SLAM) method that are shared with the central server, and a micro controller unit (MCU) configured to control an operation of the driving module based on the control instruction received from the central server.

The MCU may be configured to transmit state information of the mobile robot to the central server, where state information may include the sensor data and encoder data.

The driving module may include a first motor that drives a drive-wheel of the mobile robot in a forward direction or a reverse direction and a second motor that rotates a driving direction of the drive-wheel.

The central server may be configured to select a required quantity of the mobile robots for at least one of a polygonal form, a circular form, and a linear form required for the platooning.

The central server may include a communication unit configured to collect the state information from the mobile robot and sending the control instruction to the mobile robot, an information analysis unit configured to store and manage mobile robot information for every mobile robot operated in the factory in the form of a facility table, a path generation unit configured to generate a driving path from a current position to a destination to control platooning of the mobile robot, a database (DB) configured to store a facility table and provide work performance information and extra processible work information based on the state information of the mobile robot, and a controller configured to identify the state information of the mobile robot, and centrally control the settings of the platoon form and driving paths of individual mobile robots required for work.

The controller may be configured to set the platoon form and the platooning path by providing a setting screen for platooning control through a user interface (UI).

The path generation unit may generate the platooning path such that movements of the mobile robots are synchronized according to a platooning type determined by the controller and positions of individual mobile robots in the platooning type.

The controller may be configured to set to set a platoon name for each unit path of each node to node or each area to area included in the driving path and to set a platooning type for each unit path.

The controller may be configured to set the platooning type for each unit path as a fixed type for which the platoon form is fixed or a variable type for which the platoon form is variable.

A method for controlling mobile robot platooning by a central server is provided, where the method includes selecting, by the central server, upon receiving a work instruction to transfer an object to a work process facility, a platoon form and a plurality of mobile robots based on the object to dispose the plurality of mobile robots at starting points forming the platoon form, instructing, by the central server, when the object is loaded on the plurality of mobile robots, platooning of the mobile robots by sending a target coordinate of the work process facility and a moving path, processing, by the central server, sensor data and encoder data collected from respective mobile robots in real-time, to obtain absolute positions of the respective mobile robots, and controlling, by the central server, platooning of the mobile robots by sending a control instruction synchronized to the positions of the respective mobile robots.

The selecting may include Identifying, by the central server, the platoon form and a quantity of the mobile robots based on a size and a shape of the object, selecting, by the central server, mobile robots in an idle state, and individually setting, by the central server, positions of the selected mobile robots.

In the controlling, by the central server, of the platooning, the control instruction sent by the central server to each mobile robot may include at least one of a moving direction, a moving speed, a destination coordinate, a moving path, and a synchronization signal with respect to a current position of the mobile robot.

In the controlling, by the central server, of the platooning, the central server may collect state information of each mobile robot in real-time, and if any mobile robot in the platoon malfunctions, the central server may replace the malfunctioning mobile robot with another idle mobile robot.

The method may further include, after the controlling of the platooning, receiving, by the central server, a mobile robot home position signal measured by a sensor of the work process facility when the mobile robot arrives at the target coordinate, and correcting, by the central server, when a position deviation occurs based on comparison of the mobile robot home position signal and the target coordinate, the deviation by sending a position adjustment instruction.

In one form of the present disclosure, a central server directly controls platooning based on absolute coordinates of respective mobile robots, and even if a position deviation occurs to any one mobile robot, the central server may promptly reorganize synchronized driving through adjustment. Therefore, more accurate and flexible platoon control is available, compared to the conventional master-slave method.

Since the platoon control is performed at the central server, a high-priced embedded computing system applied to conventional AMR may be removed and the mobile robots may be implemented with down-sized MCUs, thereby enabling reduction of initial establishment cost and maintenance cost.

Depending on operation capacity of the central server, the quantity of mobile robots grouped in a platoon may be freely expanded. Furthermore, when a mobile robot in the platoon malfunctions, the malfunctioning mobile robot may be promptly replaced with an idle mobile robot, thereby preventing production line stoppage.

DETAILED DESCRIPTION

Figure 1:
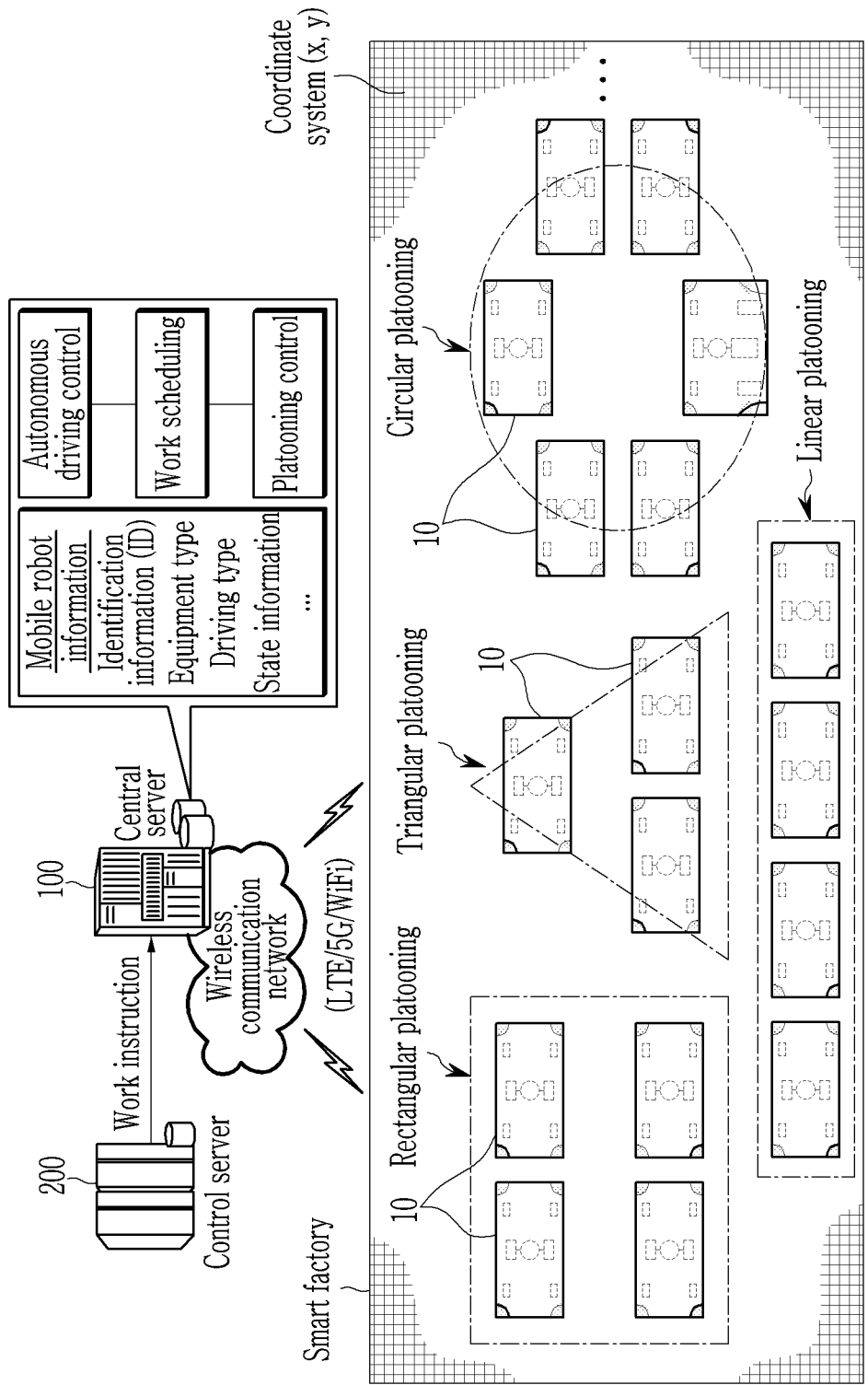
FIG. 1 is a schematic diagram illustrating a mobile robot platooning system in one form of the present disclosure.

In the following detailed description, only certain forms of the present disclosure have been shown and described, simply by way of illustration. As those skilled in the art would realize, the described forms of the present disclosure may be modified in various different ways, all without departing from the spirit or scope of the present disclosure. Accordingly, the drawings and description are to be regarded as illustrative in nature and not restrictive. Like reference numerals designate like elements throughout the specification.

In addition, unless explicitly described to the contrary, the word "comprise", and variations such as "comprises" or "comprising", will be understood to imply the inclusion of stated elements but not the exclusion of any other elements. In addition, the terms "-er", "-or", and "module" described in the specification mean units for processing at least one function and operation, and can be implemented by hardware components or software components, and combinations thereof.

Throughout the specification, terms such as first, second, 'A', 'B', '(a)', '(b)', and the like will be used only to describe various elements, and are not to be interpreted as limiting these elements. These terms are only for distinguishing the constituent elements from other constituent elements, and nature or order of the constituent elements is not limited by the term.

In this specification, it is to be understood that when one component is referred to as being "connected" or "coupled" to another component, it may be connected or coupled directly to the other component or be connected or coupled to the other component with a further component intervening therebetween. In this specification, it is to be understood that when one component is referred to as being "connected or coupled directly" to another component, it may be connected to or coupled to the other component without another component intervening therebetween.

The terms used herein are used only for the purpose of describing particular exemplary forms of the present disclosure and are not intended to limit the present disclosure.

Singular expressions include plural expressions unless clearly described as different meanings in the context.

A mobile robot platooning system and a control method thereof in some forms of the present disclosure is hereinafter described in detail with reference to the drawings.

FIG. 1 is a schematic diagram illustrating a mobile robot platooning system in some forms of the present disclosure.

Referring to FIG. 1, a mobile robot platooning system in some forms of the present disclosure includes a plurality of mobile robots 10, a central server 100, and a control server 200. The plurality of mobile robots 10 are operated for transfer of objects in a factory. The central server 100 is connected to the plurality of mobile robots 10 through wireless communication, and configured to set a path of the plurality of mobile robots 10 to control autonomous driving of the mobile robots 10. The control server 200 communicates with the central server 100 so as to allocate a work instruction for transfer of the objects.

The mobile robot 10 may be an autonomous mobile robot (AMR), in some forms of the present disclosure. However, the present disclosure is not limited thereto, and the mobile robot 10 may be an automated guided vehicle (AGV). In this case, magnets or markers may be installed on the factory floor to guide the driving path of the AGV.

The central server 100 may be a type of a cloud computing system. The central server 100 groups a platoon of the mobile robots 10 required for processing a work, disposes the platoon of the mobile robots into various platoon forms, collects state information of the platoon of the mobile robots, and controls the platoon of the mobile robots to move in a synchronized manner based on the state information.

For example, when necessary for transfer of a large item, the central server 100 may select a required quantity of the mobile robots 10, and control the platoon of mobile robots 10 in various forms such as a linear form, a rectangular form, a triangular form, and a circular form.

According to the control instruction received at the central server 100, the mobile robot 10 drives a driving module 13 and moves along an instructed moving path to a destination, in autonomous driving or in platooning. The control instruction may include a moving direction, a moving speed, the destination (e.g., in coordinates), a moving path, and a synchronization signal, with respect to a current position (e.g., in coordinates) of the mobile robot 10.

At this time, since it is not necessary to designate a master robot, the mobile robot 10 only needs to perform movement control according to the control instruction received from the central server 100 without complicated operation for synchronization/follow-up in the conventional master-slave scheme.

Therefore, the mobile robot 10 may be implemented with a micro controller unit (MCU) with minimized functions, and the expensive embedded computing system applied to conventional AMR may be omitted, thereby reducing a cost for facility and operation.

The control server 200 may be an enterprise resource planning (ERP) system and/or a manufacturing execution system (MES), and may manage the work status of the entire process in the smart factory.

The control server 200 monitors the work status of the production line and may deliver work instructions to the central server 100 such that items (parts) for each work process required for product production may be supplied at the right time.

Figure 2:
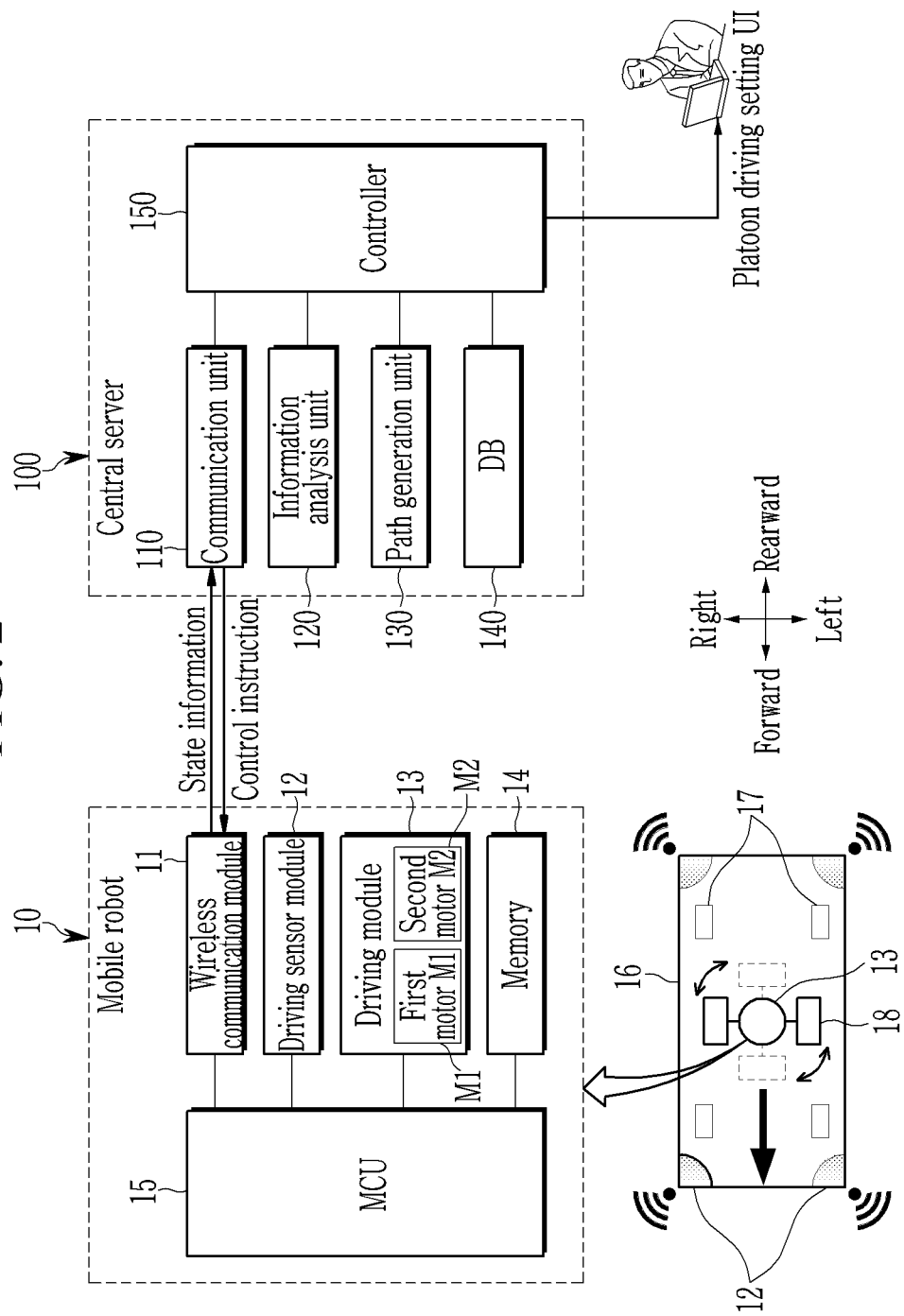
FIG. 2 is a block diagram schematically showing configuration of a mobile robot and a central server in one form of the present disclosure.

Meanwhile, FIG. 2 is a block diagram schematically showing configuration of a mobile robot and a central server in some forms of the present disclosure.

Referring to FIG. 2, the mobile robot 10 in some forms of the present disclosure includes a wireless communication module 11, a driving sensor module 12, a driving module 13, a memory 14, and an MCU 15. In addition, the mobile robot 10 may further include a plurality of casters 17 and drive-wheels 18. The plurality of casters 17 support a vehicle body 16 and may be 360-degree rotatable such that the mobile robot 10 may be stably supported, and may easily change the running direction. The drive-wheels 18 are driven by the operation of the driving module 13.

The wireless communication module 11 is connected to the central server 100 through a wireless communication network, to transmit and receive data. The wireless communication network may include at least one of a mobile communication (LTE/5G) and WiFi.

The driving sensor module 12 generates sensor data by detecting the surrounding environment of the mobile robot 10 through at least one of a laser, a camera, a Lidar, and a high-precision differential global positioning system (DGPS).

The driving module 13 generates driving torque of the mobile robot 10 by operating a motor with the power of the battery (not shown), and measures encoder data according to the operation of the motor.

In more detail, the driving module 13 includes a first motor M1 that drives the drive-wheels 18 of the mobile robot 10 in a forward direction or a reverse direction and a second motor M2 that rotates the driving direction of the drive-wheels 18. Here, the drive-wheels 18 are constrained to the vehicle body 16 by a fixing pin P0 that is operated forward and backward by a cylinder CL.

In addition, when an arrangement direction of the drive-wheels 18 is to be rotated, e.g., between forward and rearward direction and left and right direction, the fixing pin P0 is may be released and the second motor M2 is driven to rotate the arrangement direction of the drive-wheels 18, after which the fixing pin P0 is engaged to fix the direction of the drive-wheels 18.

It may be understood that driving forward by a motor coupled with drive-wheels, and changing a moving direction by another motor by rotating an axle of the drive-wheels is known in the art, and are not described in further detail.

The memory 14 stores various programs and data for driving the mobile robots 10. The memory 14 may store a factory map and a coordinate system (x, y) generated by a simultaneous localization and mapping (SLAM) method, which may be shared with the central server 100.

The MCU 15 controls overall operation of the respective modules 11, 12, and 13.

The MCU 15 transmits state information to the central server 100 through the wireless communication module 11, where the state information includes the sensor data detected by the driving sensor module 12 and the encoder data for the operation state according to the operation of the driving module 13.

In addition, the MCU 15 may analyze a control instruction received from the central server 100, and may control the operation of the driving module 13 based on a moving direction, a moving speed, a moving path to the destination, and a synchronization signal from a current position of the mobile robot 10.

Meanwhile, the central server 100 in some forms of the present disclosure includes a communication unit 110, an information analysis unit 120, a path generation unit 130, a database (DB) 140, and a controller 150.

The communication unit 110 is connected to the mobile robots 10 operated in the factory through wireless communication, and collect the state information and transmit a control instruction to the mobile robots 10.

The information analysis unit 120 may store and manage mobile robot information for every mobile robot 10 operated in the factory, e.g., in the form of a facility table. For example, the mobile robot information may include identification information (robot ID), a robot type, a driving type, the state information, and the like.

Here, the robot type may include an integral type with a palette on the upper surface, a low-floor type that pulls a carriage, a forklift type capable of lifting, a conveyor interlocking type, and the like. The driving type may include a driving type that is capable of linearly moving and rotating by using a plurality of motors as in the driving module 13, and a driving type that moves along a guiding line such as an AGV. In addition, the state information includes the sensor data according to driving of the mobile robot 10, the encoder data, and the like.

The information analysis unit 120 analyzes the state information collected by the communication unit 110, extracts the robot ID, recognizes the mobile robot 10, and acquires the sensor data and the encoder data according to the operation of the mobile robot 10.

The information analysis unit 120 searches the facility table matched to the robot ID in the DB 140 and updates real-time state information in the facility table according to the operation of the mobile robot 10.

The path generation unit 130 generates a driving path from a current position (starting point) to the destination to control driving of the mobile robot 10.

When generating a platooning path for a platoon of the mobile robots 10, the path generation unit 130 may generate the platooning path and positions of individual mobile robots 10 in the platooning type such that the movements of the mobile robots 10 are synchronized according to a platooning type determined by the controller 150.

The driving path may be set based on the coordinate system (x, y) of the factory map and may include a plurality of nodes on the path. Accordingly, the mobile robot 10 may travel through the driving path instructed by the control instruction, sequentially passing through node 1 N1, node 2 N2, . . . , node m Nm.

The DB 140 stores various program and data used by the central server 100 to control the platooning of the mobile robots 10, and may store information generated during the operation of the platooning.

For example, the DB 140 may store a facility table that has been converted into data through the information analysis unit 120, and may provide work performance information, extra processible work information, and the like, based on the state information of the mobile robot 10. In addition, the DB 140 may store work schedule for each process, real-time or reserved traffic flow of factory map, and platooning state tracking information.

The controller 150 is a central processing unit that controls the overall operation of platooning control of the mobile robots.

The controller 150 identifies the state information of the mobile robot 10 operated in the vehicle factory, and centrally control the settings of the platoon form and driving paths of individual mobile robots required for work.

The controller 150 is connected to a display or operator PC for platoon control of the mobile robot 10, and may display monitoring information of the mobile robot 10 according to the operation of the central server 100 and may receive setting information.

The controller 150 may set the platoon form and the platooning path by providing a setting screen for platooning control through the user interface (UI).

Figure 3A:
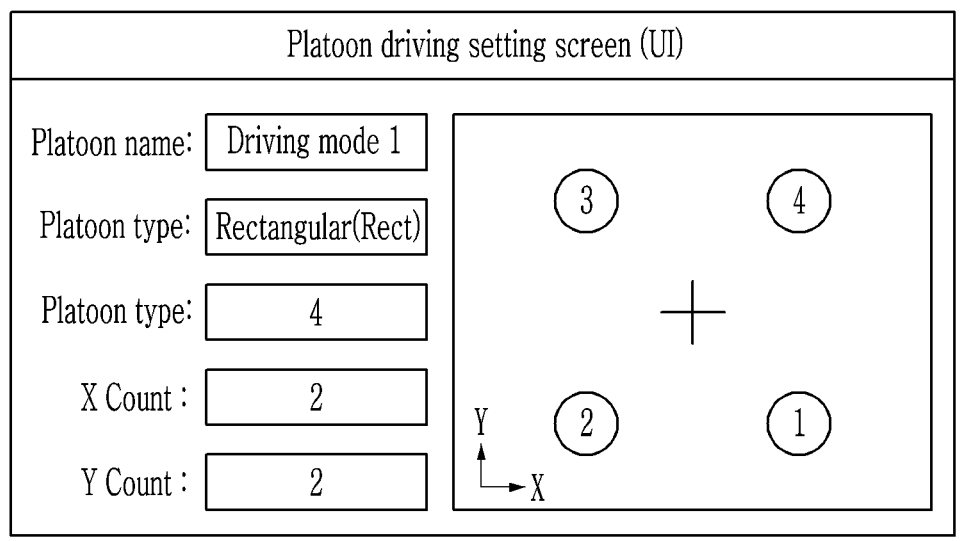
FIG. 3A and FIG. 3B show setting screens (user interface; UI) for platooning control in one form of the present disclosure.
Figure 3B:
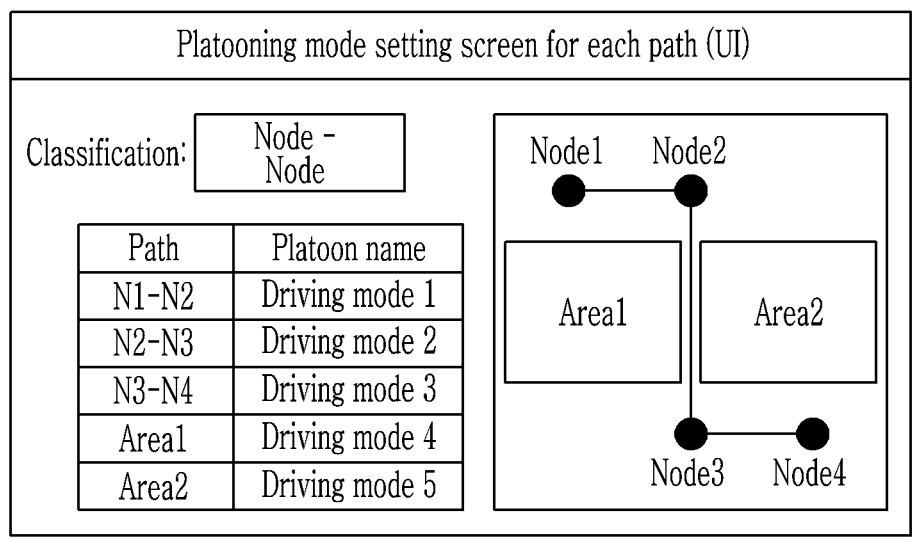

For example, FIG. 3A and FIG. 3B show setting screens (UIs) for platooning control in some forms of the present disclosure.

Referring to FIG. 3A and FIG. 3B, in order to performing platoon driving of various forms, the controller 150 may set a platoon form and the quantity of the mobile robots 10 through the platooning setting screen (UI).

The controller 150 may set the platoon form in various forms, such as a circular form, a polygonal form, linear form, and the like.

For example, as shown in FIG. 3A, the controller 150 may set four mobile robots in a rectangular (Rect) form through the platooning setting screen (UI).

It may be understood that, although a circular form and a polygonal form are geometrically different, the polygonal form is generally broader since only discrete number of robots may be used.

At this time, the controller 150 searches for the mobile robot 10 in the idle state through the DB 140, and assigns the idle mobile robot 10 to a corresponding position in the set platoon form. In addition, by default, the controller 150 may disposed equal spacing between rows and columns of mobile robots 10 forming the platoon form.

However, when an additional platoon form is applied by an operator or an existing platoon form is modified by the operator, the controller 150 enables manual adjustment through the platooning setting screen (UI) (e.g., in the right screed in the UI) after setting the quantity of the mobile robots 10 required in the platoon form.

Meanwhile, the controller 150 sets the driving path on the factory map in response to an input of the platoon's destination.

As shown in FIG. 3B, through the platooning mode setting screen (UI) for each path, the controller 150 may set a platoon name for each unit path of each node to node or each area to area included in the driving path and may set a platooning type for each unit path.

For example, the controller 150 may set the platooning type for each unit path as a fixed type for which the platoon form is fixed or a variable type for which the platoon form is variable.

Figure 4A:
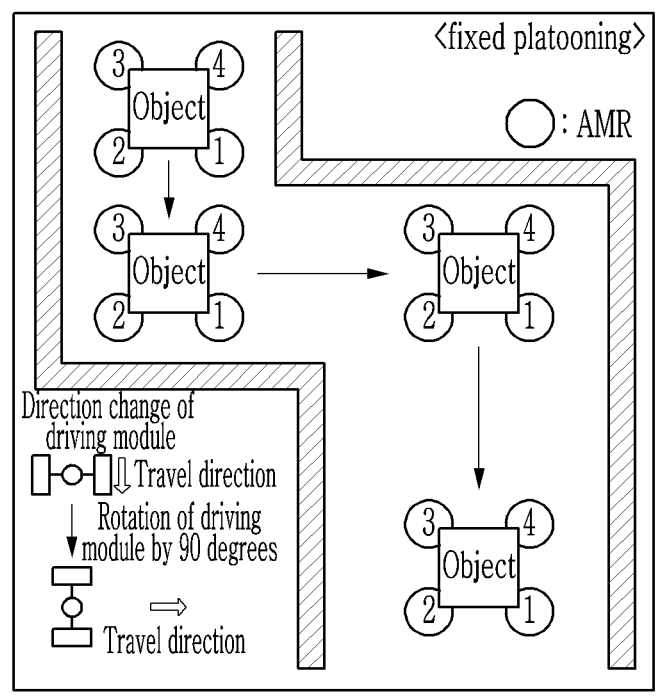
FIG. 4A and FIG. 4B show platooning state changes along a driving path for different platooning types in one form of the present disclosure.
Figure 4B:
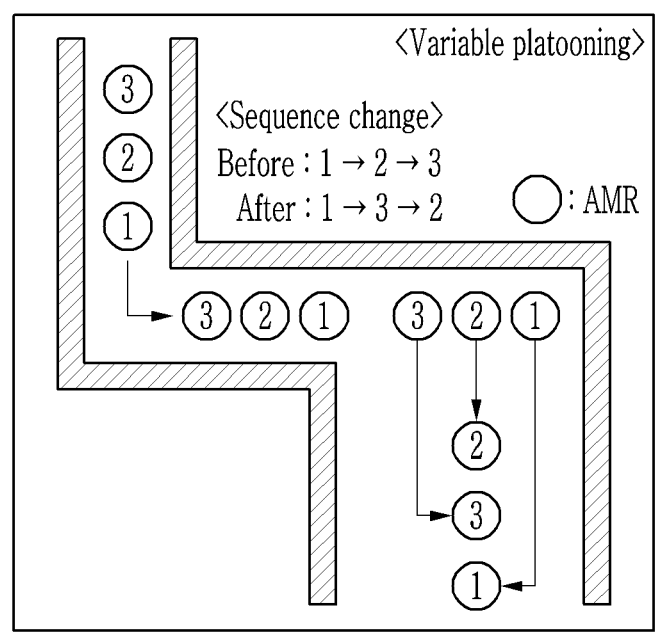

FIG. 4A and FIG. 4B show platooning state changes along a driving path for different platooning types in some forms of the present disclosure.

FIG. 4A illustrates a fixed type platooning, where the controller 150 sets a fixed platooning type of a rectangular form with respect to four mobile robots (AMRs) ①, ②, ③, and ④ to move a large-scaled object.

At this time, the mobile robots ①, ②, ③, and ④ moves along their instructed paths while keeping the rectangular platoon form. In such a fixed type, only the travel direction of the driving modules 13 of the mobile robots is rotated by 90 degrees, and the large-scaled object moved by the mobile robots is not rotated while passing through the two turning points.

In contrast, FIG. 4B illustrates a variable type platooning, where the controller 150 changes positions of the three mobile robots AMR ①, ②, and ③ during the path.

At this time, as shown in FIG. 4B, the mobile robots initially enter the turning section in a straight line in the sequence of ①, ②, and ③, and keeps the sequence until passing the two turning points. After exiting the second turning point, for conversion from movement in the horizontal direction to the vertical direction in the drawing, the sequence may be changed to ①, ②, and ③. Such a variable platooning may be useful when the mobile robots simply move to another place without causing interference with other objects, for example, when returning to home positions after moving a large-scaled object, or when moving to another working place.

As a variation, the controller 150 may differently set the platooning type and form depending on unit paths, for example, to be a fixed type of rectangular form in a certain range, to be a variable type of linear form in another range.

Meanwhile, a method for controlling mobile robot platooning in some forms of the present disclosure performed by such a mobile robot platooning system is described in detail with reference to FIG. 5 and FIG. 6.

Figure 5:
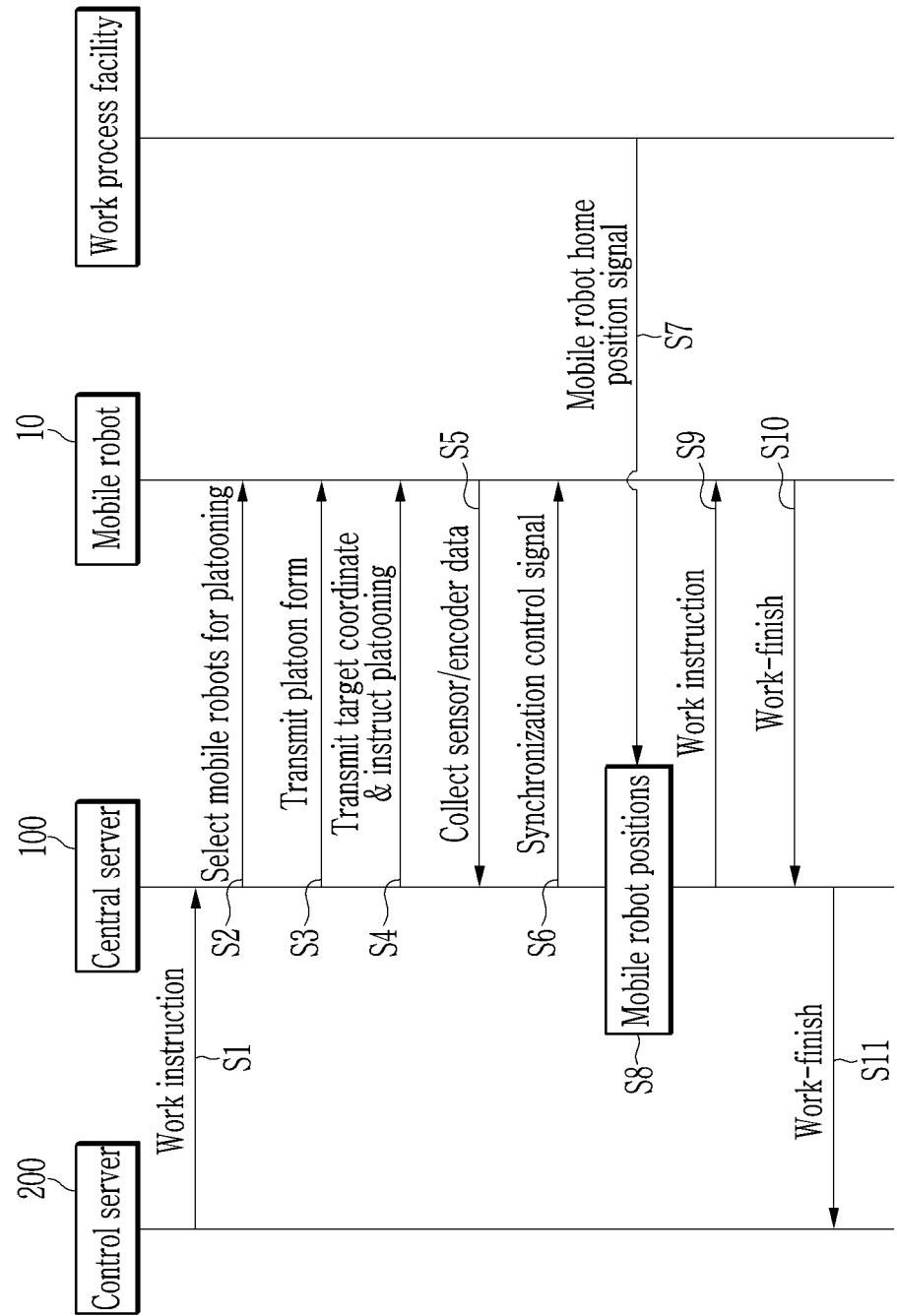
FIG. 5 is a flowchart schematically showing a method for controlling mobile robot platooning in one form of the present disclosure.

FIG. 5 is a flowchart schematically showing a method for controlling mobile robot platooning in some forms of the present disclosure.

Figure 6:
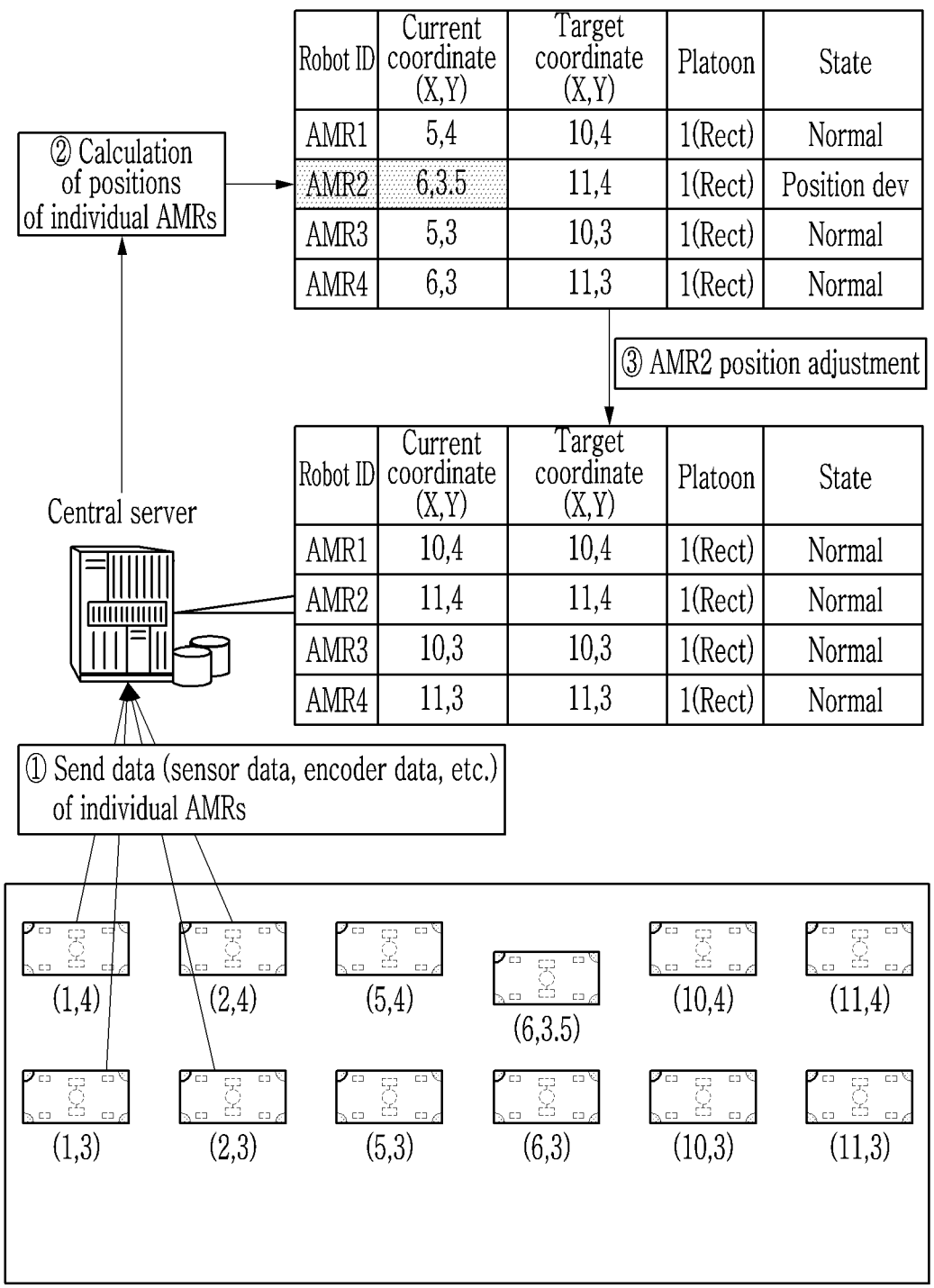
FIG. 6 shows a platooning control state based on central server control in one form of the present disclosure.

FIG. 6 shows a platooning control state based on central server control in some forms of the present disclosure.

Referring to FIG. 5 and FIG. 6, firstly at step S1, the central server 100 in some forms of the present disclosure receives a work instruction, for example, to transfer an object required a work process facility, from the control server 200.

Subsequently at step S2, the central server 100 selects the platoon form and a plurality of mobile robots 10 in consideration of the object (e.g., a component part of a vehicle) related to the received work instruction. At this time, the central server 100 identifies the platoon form and the quantity of the mobile robots 10 in consideration of, e.g., the size and shape of the object, and selects mobile robots 10 in an idle state to individually set positions of the selected mobile robots 10.

At step S3, the central server 100 sends individual position coordinates in the identified platoon form to the selected mobile robots 10 to dispose the selected mobile robots 10 at starting points forming the selected platoon form. Then at step S4, when the object is loaded onto the platoon of the mobile robots 10, the central server 100 instructs platooning by sending a target coordinate of the work process facility requiring the object and a moving path to the work process facility to the mobile robots 10. The moving path may be individually set to respective mobile robot 10 such that the mobile robot 10 may merely follow the instructed path to the work process facility. Accordingly, at step S4, while moving along its own instructed driving path, each mobile robot 10 collects the sensor data detected by the driving sensor module 12, encoder data according to operation of the driving module 13, and the like, and sends the collected data to the central server 100 in real-time.

At step S5, the central server 100 processes the sensor data and the encoder data collected from the respective mobile robots 10 in real-time for each position, to obtain absolute positions of the respective mobile robots 10. Then, at step S6, the central server 100 controls platooning of the mobile robots 10 by sending the control instruction synchronized to positions of the respective mobile robots 10. At this time, the control instruction sent by the central server 100 to each mobile robot 10 may include at least one of a moving direction, a moving speed, a destination coordinate, a moving path, and a synchronization signal with respect to a current position of the mobile robot.

Here, it should be noted that, according to an existing master-slave scheme, slave mobile robots are controlled based on relative coordinates to a master mobile robot, and in this case, there is a problem that errors such as communication delay/operation errors of the master were reflected in respective slaves.

However, in some forms of the present disclosure, as shown in FIG. 6, the central server 100 identifies position information of respective mobile robots 10 in real-time at every position, and when a position deviation occurs to any mobile robot 10, for example, due to a slip of drive wheels, such an error may be resolved by sending an instruction to adjust the position to the errored mobile robot 10. In addition, the central server 100 collects state information of each mobile robot 10 in real-time, and if any mobile robot 10 in the platoon malfunctions, the malfunctioning mobile robot may be promptly replaced with another idle mobile robot 10. At this time, through the user interface (UI), the central server 100 may delete the malfunctioning mobile robot 10 from the group and add another idle mobile robot 10 to the position of the deleted mobile robot 10.

Meanwhile, at step S7, when the mobile robot 10 arrives at the target coordinate, the central server 100 may receive a mobile robot home position signal measured by a sensor of the work process facility. Here, the mobile robot home position signal may indicate final target coordinate of each mobile robot 10 aligned for loading/unloading of the object.

At this time, when a position deviation occurs based on comparison of the mobile robot home position signal and the target coordinate, the central server 100 may correct the deviation by sending a position adjustment instruction.

When the object is appropriately aligned, the central server 100 sends a work instruction to at least one of the mobile robot 10 and the work process facility at step S9. Upon receiving the completion of the work at step S10, the central server reports the completion of the work to the control server 200, at step S11.

Thereafter, although not illustrated in the drawing, the central server 100 may control the mobile robots 10 to return to home positions or standby locations, e.g., through linear platooning, and the mobile robots 10 may be released from the platoon group, or switched to an idle state.

As such, in some forms of the present disclosure, a central server directly controls platooning based on absolute coordinates of respective mobile robots, and even if a position deviation occurs to any one mobile robot, the central server may promptly reorganize synchronized driving through adjustment. Therefore, more accurate and flexible platoon control is available, compared to the conventional master-slave method.

In addition, since the platoon control is performed at the central server, a high-priced embedded computing system applied to conventional AMR may be removed and the mobile robots may be implemented with down-sized MCUs, thereby enabling reduction of initial establishment cost and maintenance cost.

In addition, depending on operation capacity of the central server, the quantity of mobile robots grouped in a platoon may be freely expanded. Furthermore, when a mobile robot in the platoon malfunctions, the malfunctioning mobile robot may be promptly replaced with an idle mobile robot, thereby preventing production line stoppage.

The exemplary form is not limited to be implemented only by the aforementioned apparatus and/or method, and may be implemented by a program for operating a function corresponding to the configuration of the exemplary form, a recording medium in which the program is recorded, and the like, and the implementation may be easily realized from the description of the aforementioned exemplary form by those skilled in the art.

While this disclosure has been described in connection with what is presently considered to be practical exemplary forms, it is to be understood that the disclosure is not limited to the disclosed forms. On the contrary, it is intended to cover various modifications and equivalent arrangements included within the spirit and scope of the appended claims.

The invention claimed is:

1. A method for controlling mobile robot platooning by a central server, the method comprising:

receiving, by the central server, a work instruction to transfer an object to a work process facility;

when the work instruction is received, selecting, by the central server, a platoon form and a plurality of mobile robots based on the object to dispose the plurality of mobile robots at starting points forming the platoon form;

instructing, by the central server, when the object is loaded on the plurality of mobile robots, platooning of the mobile robots by sending a target coordinate of the work process facility and a moving path;

processing, by the central server, sensor data and encoder data collected from respective mobile robots in real-time, to obtain absolute positions of the respective mobile robots;

controlling, by the central server, platooning of the mobile robots by sending a control instruction corresponding to the positions of the respective mobile robots;

receiving, by the central server, a mobile robot home position signal measured by a sensor of the work process facility when each mobile robot arrives at the target coordinate; and when a position deviation occurs based on comparison of the mobile robot home position signal and the target coordinate, correcting, by the central server, the position deviation by sending a position adjustment instruction.

2. The method of claim 1, wherein selecting the platoon form and the plurality of mobile robots comprises:

identifying, by the central server, the platoon form and a quantity of the mobile robots based on a size and a shape of the object;

selecting, by the central server, mobile robots in an idle state; and individually setting, by the central server, positions of the selected mobile robots.

3. The method of claim 1, wherein the control instruction further comprises at least one of a moving direction, a moving speed, a destination coordinate, a moving path, or a synchronization signal representing a current position of each mobile robot.

4. The method of claim 1, wherein controlling the platooning of the mobile robots comprises:

collecting, by the central server, state information of each mobile robot in real-time; and when any mobile robot in the platoon malfunctions, replacing, by the central server, the malfunctioned mobile robot with a different idle mobile robot.

* * * * *